United States Patent [19]

Giroux

[11] Patent Number: 4,607,558
[45] Date of Patent: Aug. 26, 1986

[54] RUBBER BAND SLITTING MACHINE

[76] Inventor: Gilles Giroux, 1490 rue de l'Eglise, Pontbriand, Quebec, Canada, G0W 1K0

[21] Appl. No.: 720,630

[22] Filed: Apr. 8, 1985

[51] Int. Cl.⁴ .............................................. B26D 3/08
[52] U.S. Cl. ...................................... 83/879; 83/240; 83/266; 83/422; 83/424; 83/449
[58] Field of Search .................... 83/879–887, 83/449, 240, 266, 422, 424; 157/13; 198/688.1, 699.1

[56] References Cited

U.S. PATENT DOCUMENTS

| | | | |
|---|---|---|---|
| 267,415 | 11/1882 | Frank | 83/132 |
| 1,278,814 | 9/1918 | Johnson | 83/422 |
| 1,434,888 | 11/1922 | Guardino | 83/266 |
| 2,133,438 | 10/1938 | Eger | 157/13 |
| 3,291,288 | 12/1966 | Haustovich | 198/699.1 |
| 3,768,101 | 10/1973 | Kuts | 83/449 |

FOREIGN PATENT DOCUMENTS

| | | | |
|---|---|---|---|
| 136168 | 4/1880 | France | 83/24 |
| 625215 | 9/1961 | Italy | 83/865 |

Primary Examiner—James M. Meister

[57] ABSTRACT

This machine is more particularly designed to make a series of slits across the external surface of a tire rethread band. The band is moved step-by-step by a conveyor belt; a guillotine-type blade is reciprocated up-and-down over the band supported by the conveyor belt and effects a slit in the band when the conveyor is stopped; the depth of the slits can be adjusted; the inclination of the slits with respect to the longitudinal axis of the band can be varied; the distance between the slits can be adjusted by varying the stroke of the belt advancing mechanism; the conveyor belt has an outer anti-skid surface and the tire rethread band is applied against the same by spring-biased pressure rollers which accommodate tire rethread bands of various thicknesses.

11 Claims, 18 Drawing Figures

RUBBER BAND SLITTING MACHINE

FIELD OF THE INVENTION

The present invention relates to a machine for slitting elastomeric bands and, more particularly, tire rethread bands.

BACKGROUND OF THE INVENTION

Rethreaded tires often become defective because the vulcanized rethread band becomes detached due mainly to heating during use of the tire. This is especially noticeable in rethreaded tires used for trucks and the like heavy road vehicles. The practice has recently developed to make transverse slits spaced along the entire length of the rethread band in order to prevent overheating of the tire during use. These slits cannot be made during the moulding and vulcanizing of the rethread band. Up to now, it was usual to use a rotating circular blade to make those slits. However, such rotating blades, when cutting across rubber or similar elastomeric material heat up very quickly and become clogged with elastomeric material adhering thereto.

OBJECTS OF THE INVENTION

It is therefore the general object of the present invention to provide a machine for transversely slitting elastomeric bands which obviates the above-noted disadvantage.

It is another object of the invention to provide such a machine which will effect slits at equal spacing longitudinally of the band in a quick and easy manner without the cutting blade becoming coated with elastomeric material.

Another object of the invention is to provide a machine of character described in which the transverse orientation of the successive slits can be varied, the depth of the slits can be varied in accordance with the band thickness and the distance between the slits can also be varied.

SUMMARY OF THE INVENTION

The elastomeric band slitting machine in accordance with the invention comprises a support frame, a conveyor means carried by said support frame and having a generally horizontal upper conveyor run for supporting and moving the band, a reaction plate carried by said support frame and underlying said conveyor upper run intermediate the inlet and outlet ends of the conveyor means, a framework upstanding from and carried by said support frame, a blade holder located above and across said conveyor upper run opposite said reaction plate and movably carried by said framework for up and down guided movement opposite said reaction plate, a blade carried by said blade holder and having a straight cutting edge to make slits in the portion of said band lying over said reaction plate and underlying said blade, power means, linkage interconnecting said power means and said blade holder for reciprocating said blade holder up and down between an upper and a lower limit position, power-actuated means to advance said upper run step-by-step from said inlet and to said outlet ends and synchronizing means for synchronizing the movement of said blade holder with said power actuated means to stop said upper run and band when said blade engages and slits said band and advance said upper run and band when said blade is spaced above said band.

Preferably, the power means includes a rotary motor mounted on said framework and an output shaft connected to said blade holder by a crank arm and a connecting link whereby said blade holder effects a reciprocating movement of constant stroke.

Preferably, there are adjustable securing means to secure the blade to the blade holder at an adjustable level in order to adjust the depth of the slits made in the band.

Preferably, the entire framework, blade and motor and driving assembly are pivotable about a vertical axis with respect to the support frame and conveyor and there are means to clamp the framework in adjusted rotated position so as to vary the inclination of the slits made in the elastomeric band.

Preferably, the synchronizing means for advancing the conveyor upper run only when the blade is spaced above the band includes a lever pivoted by the up-and-down movement of the blade holder and operating the pawl of a pawl and ratchet device rotating the driving roller of the conveyor belt in a step-by-step manner.

Preferably, means are provided to adjust the effective operative stroke of the pawl so as to vary the length of advancing movement of the conveyor belt at each step.

DETAILED DESCRIPTION OF THE PREFERRED EMBODIMENT

Figures 1, 2, 3:
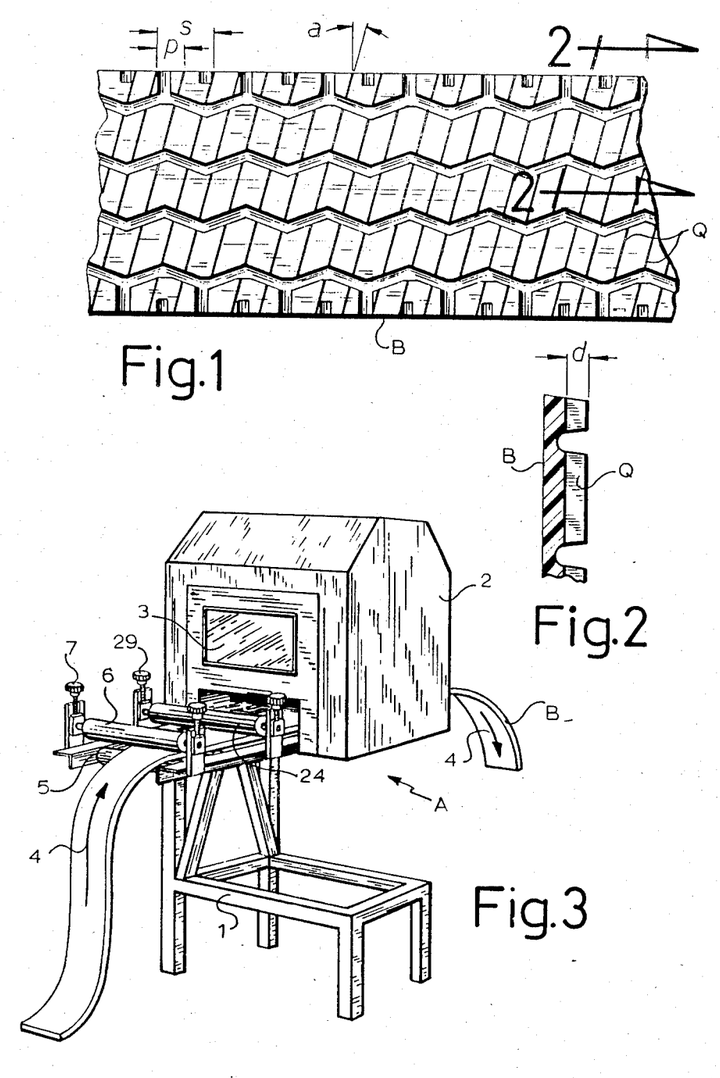
FIG. 1 is a partial plan view showing the outer surface of a tire rethread band provided with the slits made by the machine in accordance with the invention.
FIG. 2 is a partial cross-section of the rethread band taken along line 2—2 of FIG. 1.
FIG. 3 is a perspective view of the machine of the invention with the cover in position and a tire rethread band being slitted thereby.

The machine of the invention is generally indicated at A in FIG. 3 and is designed for making in an elastomeric band, and more particularly in a tire rethread band B a succession of transverse slits Q extending right across the band B of a limited uniform depth d as indicated in FIG. 2 which can be adjusted and inclined with respect to the longitudinal axis of the band B by a variable angle indicated at a in FIG. 1.

The longitudinal spacing between successive slits Q or pitch being indicated by letter p in FIG. 1, the band B advancing step-by-step through the machine A by an amount indicated by step s as shown in FIG. 3. The machine A includes a support frame 1 designed to rest on a floor and carrying the slitting machine at its upper end. The band slitting mechanism of this machine A is normally covered by a protecting cover 2 provided with a window 3 at the feeding side of the machine for inspecting the band slitting operation.

FIG. 3 shows how the band B moves through the machine in accordance with arrows 4.

Figure 7:
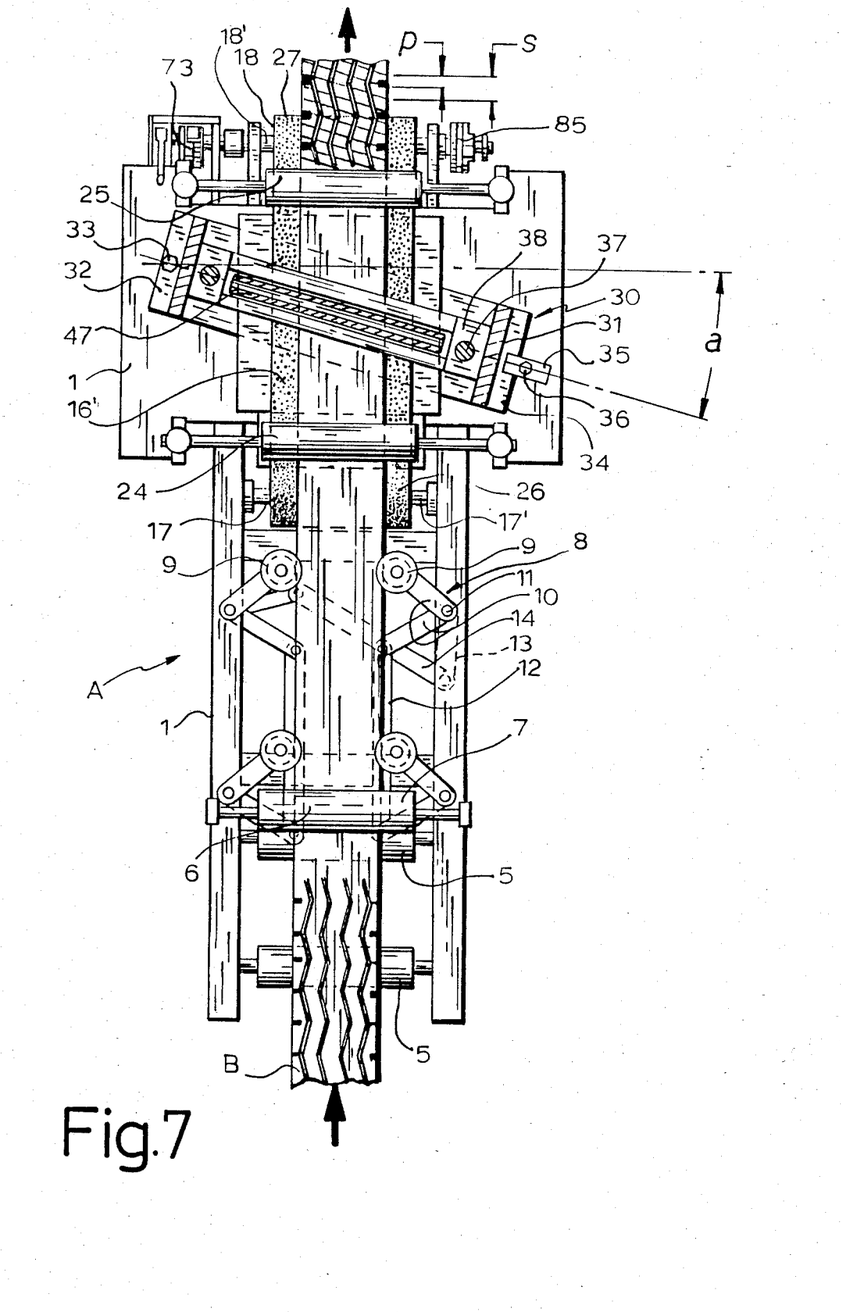
FIG. 7 is a top plan view of the entire machine and partially in plan section taken along line 7—7 of FIG. 4.
Figures 9, 13:
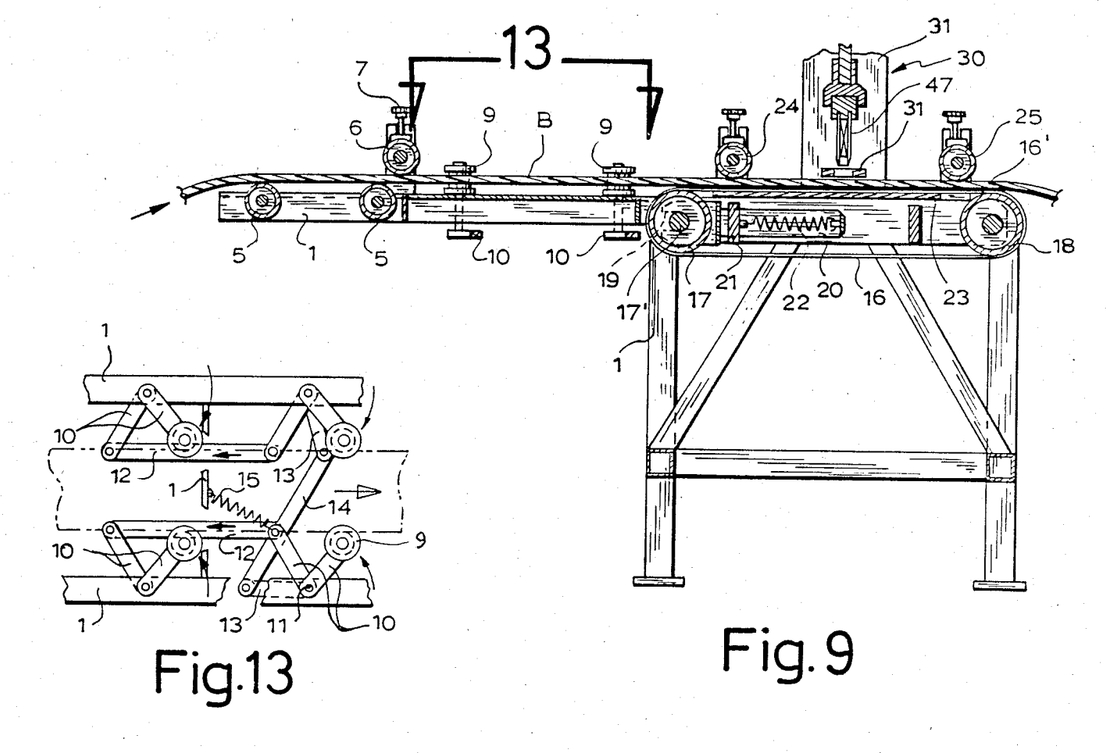
FIG. 9 shown on the 6th sheet of drawings is a longitudinal section of the machine taken along line 9—9 of FIG. 8.
FIG. 13 is a top plan view of the elastomeric band centering mechanism, taken about lines 13—13 of FIG. 9, the band shown in phantom lines.
Figure 10:
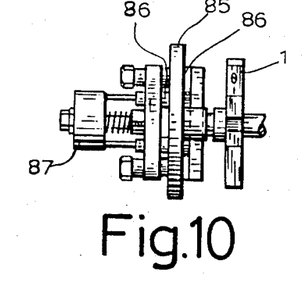
FIG. 10 shown on the 5th sheet of drawings is a side elevation on an enlarged scale of the braking device for the conveyor belt driving roller.
Figure 11:
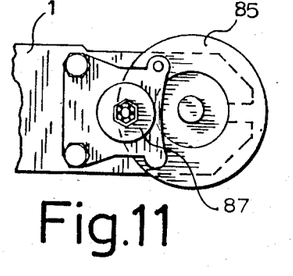
FIG. 11 is a side elevation of the same braking device.

With the cover removed, the machine, in top plan view and side longitudinal section is shown in FIGS. 7 and 9. The feeding end of the machine includes lower band supporting idle rollers 5 and rotatably carried by support frame 1 and an upper idle roller 6 extending transversely over band B and the level of which can be varied by screw knobs 7 (see FIG. 9 and also FIG. 3) so that the nip between the pair of rollers 5 and 6 can be adjusted to suit the variable thickness of the band B to be slitted.

Just downstream from the upper roller 6 there is provided a band centering mechanism shown in FIGS. 7, 9, and 13 and generally indicated at 8. Mechanism 8 includes a pair of grooved idle rollers 9 adapted to engage longitudinally-spaced edge portions of band B on each side thereof, each idle roller 9 is pivoted about a vertical axis at the outer end of an angular arm 10, the corner of each of which is pivoted at 11 to the support frame 1 on each side of the travelling band B. The outer free ends of each pair of angular arms 10 are pivotally interconnected by a connecting bar 12; to the pivot 11 of the two transversely opposite angular arms 10 is secured an additional arm 13; these arms 13 therefore rotating with their respective angular arms 10. The outer ends of the two arms 13 are pivotally interconnected by a link bar 14 extending under the travelling band B. A tension spring 15 is attached to the free end of one of the angular arms 10 and to the support frame 1. The two pairs of rollers, one pair on each side of the band B will therefore pivot in opposite direction about pivot pins 11 under the tension of spring 15 so as to engage the opposite edges of band B. If the band becomes off-center, all the rollers take an open position and the pair of rollers contacting the band urges the band to a centered position under the action of the tension spring 15 until all of the rollers contact the band.

Support frame 1 supports a conveyor means consisting of an endless conveyor belt 16 trained at the inlet side of the machine on an idle roller 17 and on the outlet side of the machine on a driving roller 18, both rotatably supported by support frame 1. A conveyor belt tightening mechanism is included. To this end, the ends of the shaft 17' of idle roller 17 are inserted within the forked end 19 of the two longitudinal legs of a U-shape stirrup 20, the legs of which, indicated at 20', are longitudinally slidable through slots made in a transverse bar 21 fixed to the support frame 1. The idle roller 17 is longitudinally moved away from driving roller 18 under the action of a tension spring 22 attached to the support frame bar at one end and to the transverse leg of stirrup 20 at its other end.

As shown in FIGS. 7 and 9 the upper run 16' of the conveyor belt 16 moves over a flat horizontal reaction plate 23 fixed to the support frame 1 and disposed between the rollers 17 and 18. As shown in FIG. 7, the outer surface of the conveyor belt 16 forms an anti-skid surface, for instance, it is provided with abrasive to make slipless contact with the underside of the band B disposed thereover, the threaded side of band B facing upwardly. Idle pressure rollers 24 and 25 are supported across the top of the conveyor upper run 16' adjacent the inlet end 26 and the outlet end 27 of the conveyor upper run 16' respectively. Each pressure roller 24, 25 is mounted for vertical movement and, as shown in FIG. 8 for the outlet pressure roller 25, each pressure roller is provided with tension springs 28 connected to the shaft of said rollers and to the support frame for urging the respective pressure rollers against the top of the band B so as to firmly apply said band against the conveyor upper run 16'; therefore, the band B is positively advanced by the conveyor belt 16 irrespective of the band thickness.

These pressure rollers 24, 25, are provided with adjusting knob mechanism 29 for adjusting the lowermost position in accordance with the band thickness. This position is selected so that the leading end of the band B, upon engaging the nip between the inlet pressure roller 24 and the inlet end portion of the upper conveyor belt run 16' is automatically caused to advance through the machine.

Step-by-step advancing movement of the conveyor belt 16 will be described hereinafter.

Figure 4:
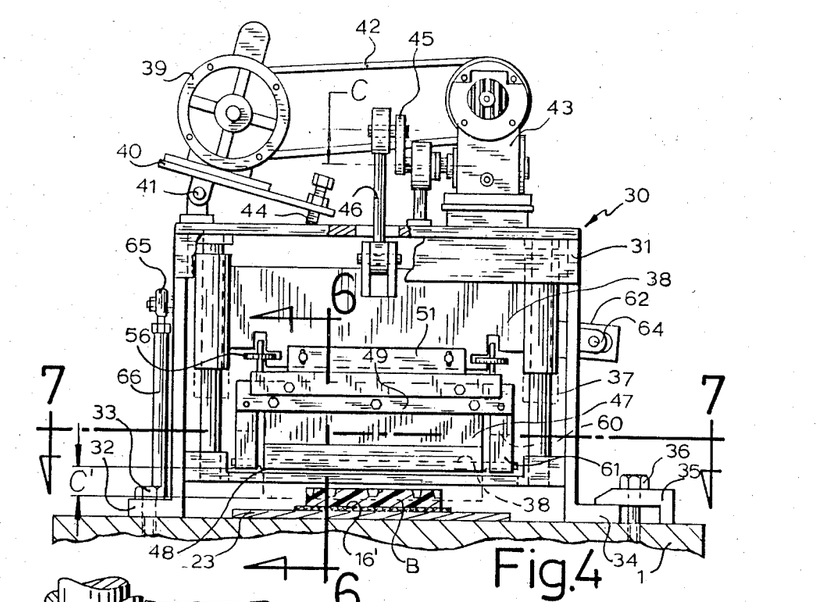
FIG. 4 is a vertical cross-section of the machine taken just upstream of and looking at the inlet side of blade assembly which is shown in elevation.
Figure 5:
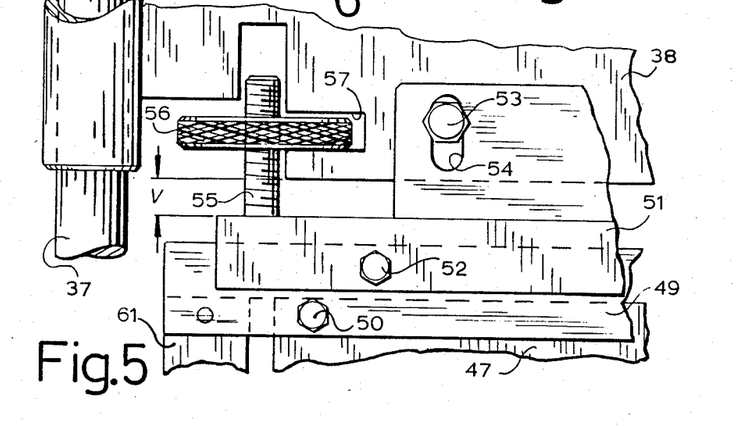
FIG. 5 is a partial enlarged view showing the blade level adjusting mechanism as shown in FIG. 4.
Figures 8, 12:
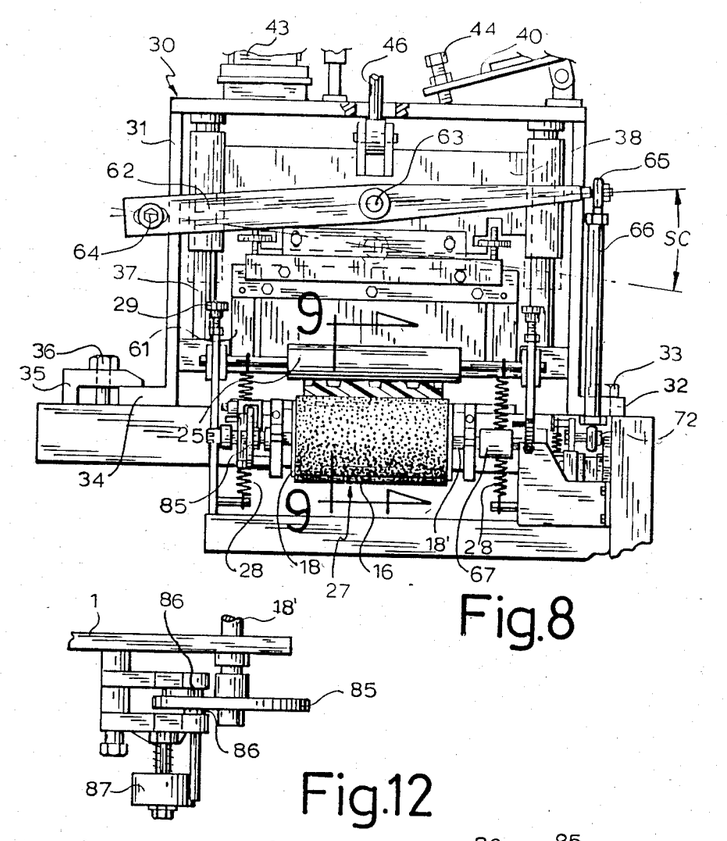
FIG. 8 is a partial end elevation looking at the output end of the machine, the slitted band being shown in cross-section.
FIG. 12 is a top plan view of the same braking device.

The band slitting mechanism is generally shown at 30 in FIG. 4, looking at the feeding side, and in FIG. 8, looking at the output side. This mechanism includes a rectangular framework 31 upstanding from the top of support frame 1 wherein the horizontal flange 32 extending from the lower end of one side of the framework 31 is pivotally supported on support frame 1 by means of a vertical pivot bolt 33. The horizontal flange portion 34 at the bottom of the opposite side of framework 31 is adjustably clamped to support frame 1 (see also FIG. 7) by means of a clamping member 35 tightened in position by a bolt 36 screwed in the support frame 1; therefore angle a can be adjusted as shown in FIG. 7, this angle indicating the angular position of the framework 31 and consequently of the one or more cutting blades carried thereby with respect to the longitudinal axis of the conveyor belt 16 and consequently of the band B to be slitted.

A pair of vertical posts 37 are fixed within framework 31 adjacent each side thereof. A blade holder 38 is guided for up-and-down movement along the posts 37, the blade holder consisting of a plate with end sleeves slidably surrounding the respective posts 37. The blade holder 38 is reciprocated in its up-and-down movement through a constant stroke by a power means and a linkage means. The power means includes an electric motor 39 fixed to a support plate 40 pivoted at 41 to the top of framework 31, its shaft driving through a transmission belt 42 the input shaft of a gear reducer unit 43 also mounted on top of the framework 31, the tension of the belt 42 can be adjusted by screwing more or less a bolt 44 in the outer end of base plate 40 and engaging the top of the framework 31. The output shaft of the gear reducing unit 43 is connected to a crank arm 45 the outer end of which is connected to the blade holder 38 through a pivoted crank rod 46.

Figure 6:
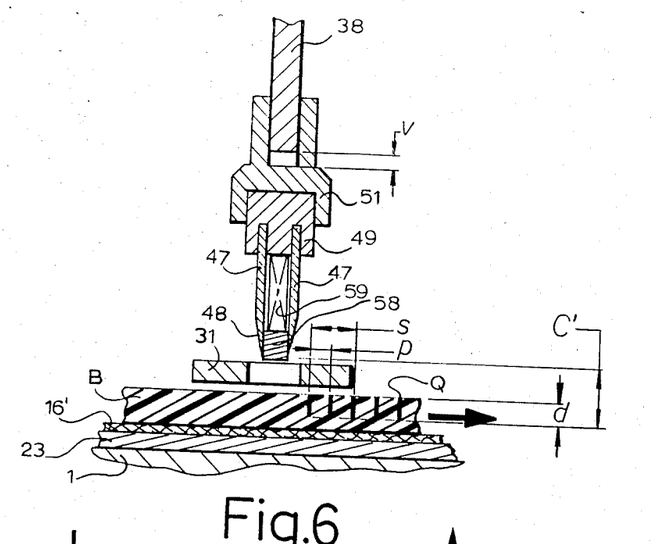
FIG. 6 is a partial cross-section taken along line 6—6 of FIG. 4.
Figure 6A:
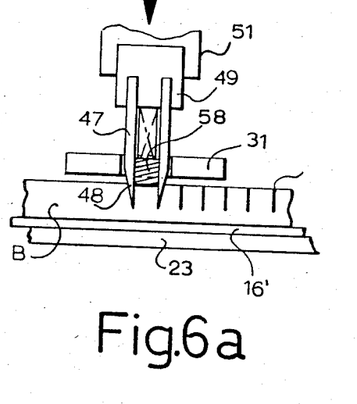
FIGS. 6a and 6b are schematic views similar to that of FIG. 6 showing the reciprocating movement of the blades.
Figure 6B:
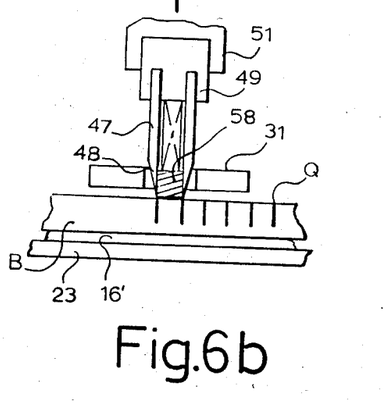

As shown in FIGS. 4 and 6 there is provided a pair of spaced parallel cutting blades 47 having straight cutting edges 48 which extend well beyond the opposite sides of the conveyor belt 16 and of, therefore, the band B supported on the same. The two blades 47 are held in slits of a header block 49 through bolts 50 and this header block 49 is in turn screwed in the lower channel of a double channel member 51 by bolts 52, the upper channel of which receives the lower end of the platelike blade holder 38 and is retained thereon by bolts 53 extending through elongated slots 54 made in double channel member 51. Each end of double channel member 51 is provided with an upstanding bolt 55 on which is threaded a knurled nut 56 freely axially retained in a notch 57 made in a side edge of the lower end of blade holder 38.

The crank arm mechanism 45, 46, causes up-and-down movement of the blade holder through a uniform stroke equivalent to twice the distance indicated at C in FIG. 4 and therefore the cutting edge 48 of each blade also makes a stroke equivalent to twice the distance indicated at C' in FIG. 4. The blade holder 38 has therefore a set lower limit position, however, the penetration depth of the cutting blades 47 into the top of the band B firmly supported on the conveyor belt upper run 16' by the underlying reaction plate 23 can be firmly adjusted by unscrewing bolts 53 and adjusting the level of the cutting blades through knurled nuts 56, then retightening bolts 53 on either side of the blades. This adjustment also enables to set the blade cutting edges 48 exactly parallel to the surface of the conveyor upper run 16' to obtain a uniform slit depth across the entire width of the band B. It should be noted that the depth d of the slits Q must not extend to the reinforcing fabric embedded in the band B.

As shown in FIGS. 4, 6, 6a and 6b, there is provided an extractor mechanism for the blades 47. This mechanism simply consists of a bar 58 slidably extending between the two cutting blades 47 and edged downwardly by compression springs 59 abutting the top of the extractor bar 58 and the bottom of the header block 49. The ends of the extractor bar 58 are slidable in slots 60 made in fingers 61 secured to and downwardly extending from either end of header block 49 on each side of the blades 47; therefore, the extractor bar 58 can take a downward limit position slightly protruding from the cutting edges 48 as clearly shown in FIGS. 6 and 6b. Therefore, during the upward stroke of the cutting blades 47 the extractor bar 58 firmly presses the band B against conveyor upper run 16'. The up-and-down movement of the cutting blades 47 must be effected in synchronism with the advancing movement of the conveyor belt 16. The mechanism to achieve this end includes a transverse lever 62 which is pivoted intermediate its ends by pivot 63 to the center of blade holder 38. One end of transverse lever 62 is pivoted at 64 to one side of the framework 31 as shown in FIG. 8. The free end of lever 62 carries a universal connector 65 such as a ball joint connecting lever 62 to a link rod 66 which is adjustable in length and which extends on the opposite side of the framework 31 downwardly to a pawl and ratchet system for driving step-by-step the driving roller 18 of the conveyor belt 16.

Figure 14:
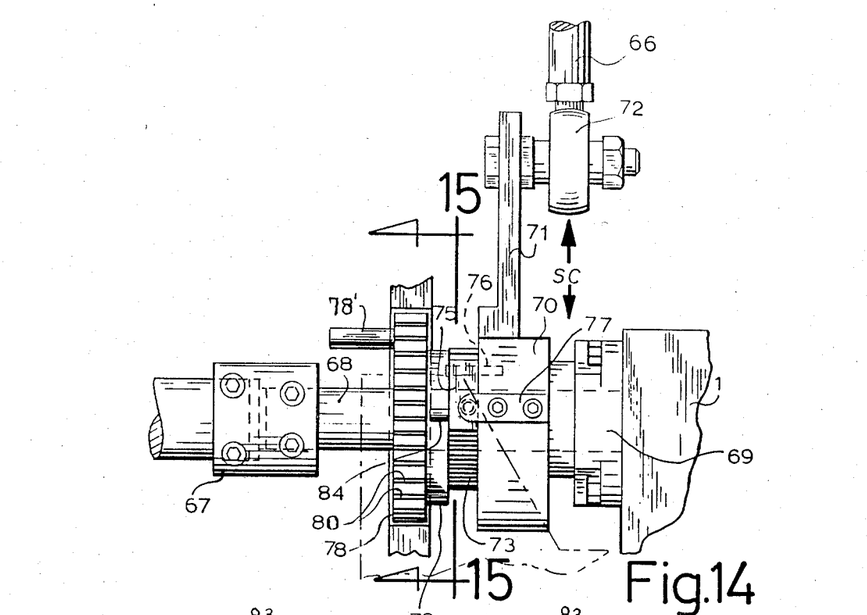
FIG. 14 is a partial elevation on an enlarged scale of part of FIG. 8 and showing the pawl and ratchet system for advancing conveyor belt.

As shown in FIGS. 8, 14, 15, and 15a, one end of the shaft 18' of the driving roller 18 is connected by a collar 67 to a stub shaft 68 which is journalled in a bearing 69 fixed to support frame 1. A sleeve 70 is freely rotatable on stub shaft 68. Sleeve 70 carries a radial arm 71, the outer end of which is connected to the lower end of the link rod 66 through another universal connector 72. A ratchet wheel 73 is keyed to stub shaft 68 at 74 and is disposed adjacent sleeve 70. A pawl 75 is pivoted on a pin 76 carried by the sleeve 70 and is engageable with the ratchet teeth of ratchet wheel 73 under the action of a leaf spring 77 carried by sleeve 70 as shown in FIG. 14 and schematically illustrated also at 77 in FIGS. 15, and 15a. A disk 78 is freely rotatably mounted on the stub shaft 68 and carries on one side a cam 79 which abuts against the ratchet wheel 73. Disk 78 has a series of peripheral grooves 80 selectively engageable by a locking wedge 81 releasably locking the disk 78 in the desired rotated position by means of bolt 82 threaded through support frame 1. If desired, another set screw 83 may be provided to further lock the disk and cam in selected rotated position.

A cam follower pin 84 is fixed to the outer end of pawl 75 and rides on a radially-relatively-smaller circular surface portion 79' of cam 79 during the operative stroke of the pawl 75 until pin 84 engages the step 79'' of the cam causing release of the pawl from the ratchet teeth at the end of the operative stroke against the action of the leaf spring 77. It follows that despite the fact that the lever arm 71 imparts a constant stroke to the pawl 75 as indicated at S' in FIG. 15, the advancing stroke S imparted to the band B can be adjusted by rotatably positioning the cam 79. With two cutting blades 47 as shown, the pitch P between each pair of slits Q is uniform but the stroke S can be selected to any desired value but is preferably selected to twice pitch P. With a single blade 47, the pitch P remains the same but can be lengthened or shortened.

Figure 15:
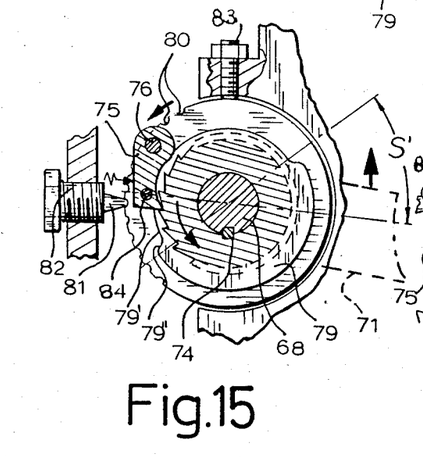
FIG. 15 is a cross-section taken along line 15—15 of FIG. 14.
Figure 15A:
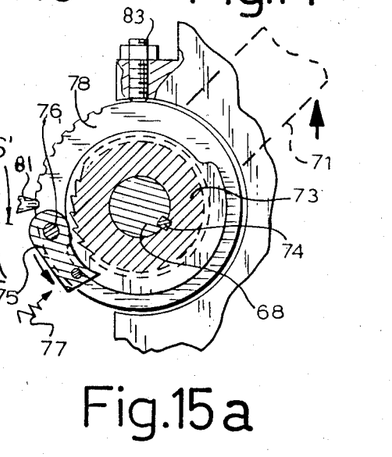
FIG. 15a is a view similar to that of FIG. 15 but showing the pawl at the end of an operative stroke.

It will be noted that pawl 75 causes rotation of the driving roller 18 during upward movement of the link rod 66 and, therefore, during the upward movement of the cutting blades 47 and after these blades have cleared the band B so that this band remains stationary during the slitting operation.

To further ensure that the foregoing takes place, a braking system imparts an adjustable braking force on the driving roller 18. The braking device is shown in FIGS. 8, 10, 11, and 12 and includes a brake disk 85 which is secured to the end of the driving roller shaft 18' opposite to the pawl and ratchet system just described and a pair of brake pads 86 engaging opposite sides of the brake disk 85 and carried by the support frame 1, one of the brake pads 86 being adjustably applied against the brake disk 85 by the adjusting knob 87. This brake disk system is of conventional construction. The braking force applied to the driving roller is sufficient to keep the conveyor belt 16 stationary during the return stroke of the pawl 75 but insufficient to prevent advancing movement of the conveyor belt.

Handle rod 78, (see FIG. 14) is fixed to disc 78 to facilitate rotation of the same for its adjustment.

What I claim is:

1. An elastomeric band slitting machine comprising a support frame, conveyor means carried by said support frame and having an upper generally horizontal conveyor run for supporting and moving an elastomeric band from an inlet end to an outlet end of said conveyor means, a reaction plate underlying said conveyor upper run and fixed to said support frame intermediate said inlet and outlet ends, an upstanding framework carried by said support frame, overlying said conveyor upper run, a blade holder located above and across said conveyor upper run, movably carried by said framework for up and down guided movement opposite said reaction plate, a blade carried by said blade holder and having a straight cutting edge to make slits in the portion of said band lying over said reaction plate, power means, linkage means interconnecting said power means and said blade holder for reciprocating said blade holder up and down between an upper and a lower limit position, power actuated means to advance said conveyor upper run step-by-step from said inlet end to said outlet end, and synchronizing means for synchronizing movement of said blade holder with said power actuated means to stop said conveyor upper run and said band when said blade engages and slits said band and to advance said conveyor upper run and said band when said blade is spaced above said band, wherein said power actuated means and said synchronizing means include a driving roller for said conveyor means, a ratchet wheel fixed to said driving roller, a pawl for rotating said ratchet wheel and driving roller in a step-by-step manner, a transverse lever pivoted to said blade holder intermediate its ends and to said framework at one end and a reciprocating link pivotally connecting the other end of said transverse lever and said pawl, the latter having an operative stroke rotating said ratchet wheel through a predetermined step and thus advancing said conveyor upper run one step during upward movement of said blade holder and having a return stroke during downward movement of said blade holder.

2. A machine as defined in claim 1, wherein said framework has one side pivoted to said support frame about a generally vertical pivot pin and further including clamping means for clamping a selected horizontal portion of the opposite side of said framework to said support frame in order to vary the angle of the slits made by said blade relative to the longitudinal axis of said band.

3. The machine as defined in claim 1, wherein said conveyor means includes an endless conveyor belt with an outer anti-skid surface.

4. The machine as defined in claim 3, further including spring-biased idle pressure rollers carried by said support frame over and transversely of said conveyor upper run adjacent said inlet and said outlet ends to press said band onto said upper run.

5. The machine as defined in claim 4, further including band supporting idle rollers and a band centering means carried by said support frame upstream from said inlet end for feeding said band in centered position to the nip of said upper run and pressure roller at said inlet end.

6. The machine as defined in claim 1, wherein said power means includes a rotary motor mounted on said framework and an output shaft, said linkage means including a crank arm fixed to said output shaft and a tie rod pivotally linking said crank arm and said blade holder whereby the stroke of the latter is constant, and further including adjustable securing means to secure said blade to said blade holder at an adjustable level in order to adjust the depth of the slits made in said band by said blade.

7. The machine as defined in claim 1, further including an adjustable brake applied to said driving roller to prevent movement of said conveyor means during the return stroke of said pawl while allowing advancing movement of said conveyor means during the operative stroke of said pawl.

8. The machine as defined in claim 1, further including means to adjust the advancing step of said conveyor upper run including a disk freely rotatable about the axis of said ratchet wheel and driving roller, adjacent said ratchet wheel, means to fix said disk at an adjustable rotated position with respect to said support frame, a cam formed on said disk and a pin carried by said pawl and slidable on said cam, said cam causing said pawl to disengage said ratchet wheel at the end of a variable portion of its operative stroke in accordance with the rotated position of said disk.

9. The machine as defined in claim 1, wherein there are two spaced parallel blades carried by said blade holder and two slits are made by said two blades in said band at each advancing step of said conveyor upper run.

10. The machine as claimed in claim 9, further including an extractor means for said blades including a bar extending between said blades and biased against said band.

11. The machine as defined in claim 1, wherein the straight cutting edge of said blade extends beyond both side edges of said conveyor top run in order to make slits in said band extending completely across the latter.

* * * * *